(12) United States Patent
Savord

(10) Patent No.: US 6,380,766 B2
(45) Date of Patent: *Apr. 30, 2002

(54) INTEGRATED CIRCUITRY FOR USE WITH TRANSDUCER ELEMENTS IN AN IMAGING SYSTEM

(76) Inventor: Bernard J Savord, 243 Highland Rd., Andover, MA (US) 01810

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/272,946

(22) Filed: Mar. 19, 1999

(51) Int. Cl.[7] .............................. H03B 1/00; H03K 3/00
(52) U.S. Cl. ......................................... 327/108; 327/333
(58) Field of Search ................................. 327/108, 111, 327/112, 333

(56) References Cited

U.S. PATENT DOCUMENTS

| | | | | |
|---|---|---|---|---|
| 4,704,551 A | * | 11/1987 | Berger | 307/575 |
| 5,386,395 A | * | 1/1995 | Le Guerinel et al. | 367/135 |
| 5,576,570 A | * | 11/1996 | Ohsawa et al. | 257/369 |
| 5,852,371 A | * | 12/1998 | Merritt et al. | 326/81 |
| 5,997,479 A | * | 12/1999 | Savord et al. | 600/447 |
| 6,043,534 A | * | 3/2000 | Sogo | 257/342 |
| 6,050,945 A | * | 4/2000 | Peterson et al. | 600/443 |
| 6,135,963 A | * | 10/2000 | Haider | 600/447 |

OTHER PUBLICATIONS

600 V Single–Chip Power Conversion System Base on Thin Layer Silicon–on–Insulator, Letavic et al., IEEE International SOI conference, P133–134, Oct. 1998.*
Emery et al., Optoelectronic Transmitters for Medical Ultrasond Transducers, IEEE, vol. 42, No. 2, Mar. 1995, pp. 188–199.*

Multilayer Piezoelectric Ceramics for Two–Dimensional Array Transducers, Richard L. Goldberg, et al., IEEE Transactions on Ultrasonics, Ferroelectrics, and Frequency Control, vol. 41, No. 5, Sep. 1994, pp. 761–771.

High–voltage devices and circuits fabricated using foundry CMOS for use with electrostatic MEM actuators, N.I. Maluf et al., Sensors and Actuators A 52 (1996), pp. 187–192.

* cited by examiner

Primary Examiner—Toan Tran
Assistant Examiner—Quan Tra
(74) Attorney, Agent, or Firm—John Vodopia

(57) ABSTRACT

Integrated circuitry for use with an ultrasound transducer of an ultrasound imaging system is disclosed. According to one embodiment of the invention, unique transducer circuitry comprises a low-voltage circuit and a high-voltage circuit including at least one high-voltage FET to drive an ultrasound transducer element. The low-voltage circuit and the high-voltage circuit are monolithically formed on a single substrate. The low-voltage circuit may include high density digital logic circuitry to generate transmit signals to the transducer element, as well as low noise analog receive circuitry to process signals received from the transducer element. The high-voltage FET of the high-voltage circuit comprises a lightly-doped drain region to increase the breakdown voltage of the high-voltage FET. The low and high-voltage circuits may be fabricated together on a single substrate using conventional low-voltage CMOS processing techniques.

9 Claims, 15 Drawing Sheets

INTEGRATED CIRCUITRY FOR USE WITH TRANSDUCER ELEMENTS IN AN IMAGING SYSTEM

FIELD OF THE INVENTION

This invention relates to ultrasound imaging for medical applications and, more particularly, to integrated circuitry including both low and high-voltage components for use with ultrasound transducer elements.

BACKGROUND OF THE INVENTION

Ultrasound imaging systems for medical applications typically employ arrays of individual ultrasound transducer elements which transmit and receive ultrasound energy. The transducer array transmits ultrasound energy into a region of interest in a patient, and receives reflected ultrasound energy, or echos, from various structures and organs within the patient's body. The imaging system then processes electronic signals generated by the elements of the transducer array, based on the received ultrasound energy, to form an image of the region of interest. The quality or resolution of the image formed is a function of the number of transmit and receive transducer elements that constitute the transducer array.

Accordingly, to achieve high image quality, a large number of transducer elements is desirable. For both two-dimensional and three-dimensional imaging applications, a preferred number of transducer elements is typically determined by a desired image resolution. The transducer elements typically are located in a hand-held transducer "head" or "handle" which is connected by a flexible cable to an electronics unit that processes the transducer signals and generates ultrasound images, as described above. Some proposed transducer heads may also include circuitry to provide transmit signals to, and process receive signals from, the individual transducer elements. Practical considerations of size, cost, and the complexity of this circuitry, as well as practical limits on the size and flexibility of the cable which carries signal conductors connecting the transducer elements to the electronics unit, pose challenges to the design of a transducer head that incorporates a large number of transducer elements for high resolution imaging applications.

In some proposed ultrasound imaging systems, the transmit circuitry that may be included in the transducer head includes high-voltage components to drive the individual ultrasound transducer elements. In some cases, low-voltage high-density digital logic circuitry to provide transmit signals to the high-voltage drivers may also be included in the transducer head. The high-voltage drivers are made from high-voltage components that are capable, for example, of operating voltages of up to approximately 100 volts. The high-voltage drivers may be fabricated as discrete components or as integrated circuits including several drivers. The low-voltage logic circuitry is fabricated as a separate integrated circuit having an operating voltage on the order of 5 volts.

In addition to transmit circuitry including the high-voltage drivers and low-voltage logic circuitry, some proposed transducer heads may include low noise, low-voltage analog receive circuitry. The low-voltage receive circuitry, like the transmit logic circuitry, typically has an operating voltage on the order of 5 volts, and may be a separate integrated circuit or may be fabricated with the low-voltage transmit logic circuitry as a monolithic integrated circuit.

As discussed above, in order to facilitate the use of a large number of transducer elements to achieve high-quality ultrasound images, it is desirable to integrate as much circuitry as possible in as small a volume as possible to reduce the size and complexity of the circuitry, whether the circuitry be located within a transducer head or in an electronics unit separate from the transducer head. In particular, if the circuitry is included in the transducer head, it is desirable to reduce the number of interconnections between any discrete integrated circuits and components within the head, as well as the number of signal conductors in the cable connecting the transducer head to the electronics unit. However, notwithstanding a reduced number of interconnections or signal conductors, the discrete high-voltage components typically employed to drive the transducer elements take up valuable space within the transducer head.

In addition, some applications, for example very high-frequency ultrasound imaging, require that transmit circuitry be located as close as possible to the transducer elements to avoid signal loading by a long cable. Accordingly, it would be advantageous to integrate high-voltage drivers for ultrasound transducer elements with either or both of the low-voltage transmit logic circuitry and the low-voltage receive circuitry as a monolithic integrated circuit.

However, high-voltage devices do not readily lend themselves to fabrication using conventional processing techniques for low-voltage integrated circuits. For example, high-voltage FETS are typically fabricated using relatively large geometry processes (10 microns) to achieve high breakdown voltages. In contrast, low-voltage integrated circuits may be fabricated using submicron geometry processes. The requirement of large junction areas for high-breakdown-voltage components is difficult to achieve using the small-geometry, high-density processing techniques employed in the fabrication of low-voltage integrated circuits. Additionally, high-voltage fabrication processes have the disadvantage that they often do not include the capability of fabricating bipolar junction transistors, which are used in many low-noise signal processing applications.

One proposed application related to actuation of mechanical devices is reported in "High voltage devices and circuits fabricated using foundry CMOS for use with electrostatic MEM actuators," N. I. Maluf et al., Sensors and Actuators, vol. A52, pp. 187–192, 1996. In this proposal, high-voltage components and circuits for use with electrostatic micro-electromechanical (MEM) devices are fabricated using conventional processing techniques for high-density, low-voltage integrated circuits. In one example of this application, MEM actuators requiring a high-voltage drive are monolithically integrated on a single substrate with high-voltage components, using low-voltage processing techniques.

For this application, high-voltage MOS transistors are fabricated using a 2.0 micron CMOS process that includes the formation of N-well and P-base layers as lightly doped drains. High-voltage transistors fabricated in this manner are reported to have operating voltages of approximately 100 volts or less for NMOS structures, and approximately −25 volts or less for PMOS structures. However, the use of low-voltage integrated circuit processing techniques for the fabrication of high-voltage components is limited in this application to simple high-voltage differential amplifiers for driving aluminum electrostatic MEM actuator structures.

One possible approach to integrating high and low-voltage circuitry is to design and develop a custom integrated circuit fabrication line dedicated to a hybrid process. Such a hybrid process would require many masks for the various steps necessary to implement both the high and low-voltage components, and would present several optimization challenges. Moreover, designing and implementing a dedicated integrated circuit fabrication line for a custom process would be cost effective only if a large number of the custom integrated circuits are manufactured.

Another proposed solution for optimizing ultrasound imaging systems includes the design of a low-voltage transducer element by using multi-layer ceramics. Such low-voltage transducer elements eliminate the need for high-voltage transducer driver circuitry. However, as in the case of a custom integrated circuit hybrid fabrication process, the multi-layer ceramics used for low-voltage ultrasound transducer elements are costly and difficult to produce.

Accordingly, for ultrasound imaging systems and many other applications, it is desirable to integrate both high and low-voltage circuitry in a monolithically fabricated integrated circuit using readily available and reasonably cost-effective processing techniques. In particular, the integration of high and low-voltage circuitry would provide advantages for ultrasound imaging systems by facilitating the packaging of higher density high and low voltage circuitry, as well as a large number of transducer elements, in the small volume of a transducer head.

SUMMARY OF THE INVENTION

In view of the foregoing, the present invention is directed to integrated circuitry including both high and low-voltage components for use with transducer elements of an ultrasound imaging apparatus. According to one embodiment of the invention, the integrated circuitry comprises a low-voltage circuit and a high-voltage circuit including a high-voltage FET to drive an ultrasound transducer element. The low-voltage circuit and the high-voltage circuit are monolithically formed on a single substrate.

In one aspect of the invention, the low-voltage circuit includes conventional low-voltage CMOS circuitry having a CMOS breakdown voltage. The high-voltage FET of the high-voltage circuit includes a lightly doped drain region which is doped such that a drain-substrate breakdown voltage of the high-voltage FET is greater than the CMOS breakdown voltage of the low-voltage circuit. The lightly doped drain region of the high-voltage FET may be a lightly doped n-well or n-base region for an NMOS device, or a lightly doped p-well or p-base region for a PMOS device.

According to another aspect of the invention, the low-voltage circuit of the integrated circuitry includes high-density digital logic circuitry electrically coupled to the high-voltage circuit. The high-density digital logic circuitry may include a digital sequencer. In yet another aspect, the low-voltage circuit includes a low-voltage transmit circuit and a low-voltage receive circuit. In this aspect, the low-voltage transmit circuit includes high-density digital logic circuitry electrically coupled to the high-voltage circuit, and the low-voltage receive circuit includes low noise analog receive circuitry to process a receive signal from the ultrasound transducer element.

According to another aspect of the invention, the high-voltage circuit includes a pull-up circuit electrically coupled between a high voltage and the high-voltage FET. The pull-up circuit may include one or more resistors, bipolar junction transistors, or FETs. Additionally, the pull-up circuit may include a cascoded series configuration of at least two pull-up transistors, electrically coupled to the high voltage and having a pull-up control gate, to output a drive current to the ultrasound transducer element based on a drive signal input to the pull-up control gate. The pull-up circuit may also include a gate drive transistor to receive an input signal from the low-voltage circuit and output the drive signal to the pull-up control gate.

In another example of a pull-up circuit according to one embodiment of the invention, the pull-up circuit includes a pull-up transistor circuit electrically coupled to the high-voltage, comprising at least one pull-up transistor having a pull-up control gate. If the pull-up transistor circuit includes more than one pull-up transistor, each pull-up transistor has a pull-up control gate and is connected in series with another pull-up transistor. The pull-up transistor circuit outputs a drive current to the ultrasound transducer element based on a drive signal input to the pull-up control gate of each pull-up transistor. The pull-up circuit also includes a gate drive transistor for each pull-up transistor, wherein each gate drive transistor receives an input signal from the low-voltage circuit and outputs the drive signal to the pull-up control gate of a respective pull-up transistor.

In another embodiment, the invention includes integrated circuitry for use with ultrasound transducers, comprising a first low-voltage CMOS circuit including high density digital logic circuitry having a CMOS breakdown voltage and a high-voltage CMOS circuit to drive an ultrasound transducer element. The high-voltage CMOS circuit receives an input signal from the first low-voltage CMOS circuit and includes a high-voltage FET. The high-voltage FET includes a lightly doped drain region and has a breakdown voltage greater than the CMOS breakdown voltage. The first low-voltage CMOS circuit and the high-voltage CMOS circuit are monolithically formed on a single substrate.

The integrated circuitry according to this embodiment of the invention may further include a second low-voltage CMOS circuit monolithically formed with the first low-voltage CMOS circuit and the high-voltage CMOS circuit on the single substrate. The second low-voltage CMOS circuit may include low noise analog receive circuitry to process a receive signal from the ultrasound transducer element.

According to yet another embodiment, the invention is directed to an integrated high-voltage driver circuit for use with ultrasound transducers. The integrated high-voltage driver circuit comprises a high-voltage FET driver to drive an ultrasound transducer element, and a pull-up circuit. The pull-up circuit includes a pull-up transistor circuit electrically coupled to a high voltage and having a driver output electrically coupled to one of a source and a drain of the high-voltage FET driver. The pull-up transistor circuit comprises at least one pull-up transistor having a pull-up control gate, and if the pull-up transistor circuit includes more than one pull-up transistor, each pull-up transistor has a pull-up control gate and is connected in series with another pull-up transistor. The pull-up transistor circuit outputs a drive current to the ultrasound transducer element based on a drive signal input to the pull-up control gate of each pull-up transistor. The pull-up circuit also includes a gate drive transistor for each pull-up transistor, wherein each gate drive transducer receives an input signal and outputs the drive signal to the pull-up control gate of a respective pull-up transistor. The high-voltage FET driver and the pull-up circuit are monolithically formed on a single substrate.

In one aspect, the integrated high-voltage driver circuit further includes an inverter to receive the input signal and output a transmit signal to a driver control gate of the high-voltage FET driver. In yet another aspect, the pull-up transistor and the gate drive transistor of the pull-up circuit are high-voltage FETs.

According to yet another aspect of the integrated high-voltage driver circuit, the pull-up transistor of the pull-up circuit includes a plurality of pull-up transistors cascoded in series. The plurality of cascoded pull-up transistors is coupled between the high voltage and either the source or the drain of the high-voltage FET driver. The gate drive transistor may also include a plurality of gate drive transistors, wherein each gate drive transistor outputs a drive signal to one of the plurality of pull-up transistors.

Other advantages, novel features, and objects of the invention will become apparent from the following detailed description of the invention when considered in conjunction with the accompanying drawings.

BRIEF DESCRIPTION OF THE DRAWINGS

The accompanying drawings, which are incorporated herein by reference, are not intended to be drawn to scale. In the drawings, each identical or nearly identical component that is illustrated in various figures is represented by a like numeral. For purposes of clarity, not every component may be labeled in every drawing, wherein.

DETAILED DESCRIPTION

Figure 1A:
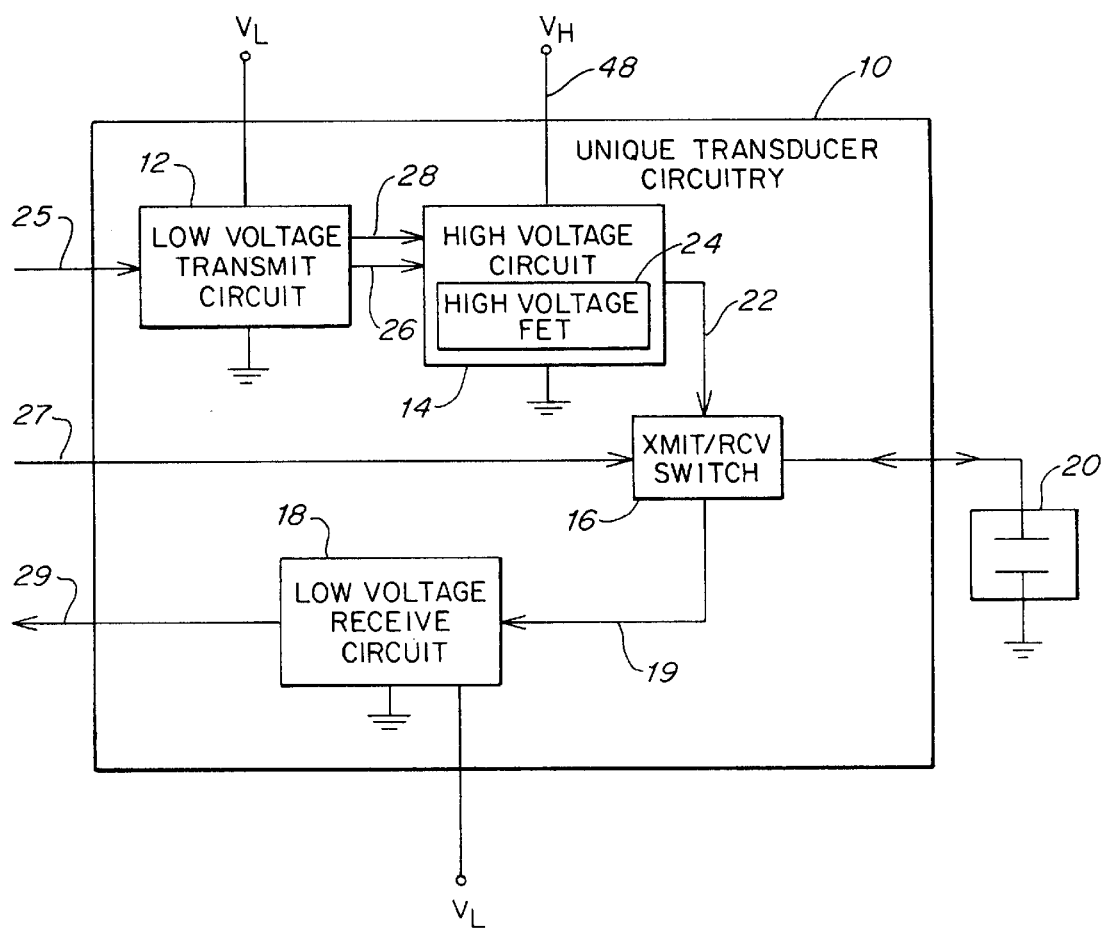
FIG. 1A is a block diagram of integrated circuitry for use with ultrasound transducers according to one embodiment of the invention.

A simplified block diagram of integrated circuitry for use with ultrasound transducers according to one embodiment of the present invention is shown in FIG. 1A. Unique transducer circuitry 10 includes at least one of a low-voltage transmit circuit 12 and a low-voltage receive circuit 18. Both the low-voltage transmit circuit 12 and receive circuit 18 are shown in FIG. 1A connected between a supply voltage VL, typically on the order of approximately 5 volts, and ground. The low-voltage transmit circuit 12 receives one or more control signals, for example, from an electronic unit of an ultrasound imaging system or other circuitry (not shown) via line 25, and outputs one or more low-voltage transmit signals via lines 26 and 28. The low-voltage receive circuit 18 processes signals, input via line 19, that represent ultrasound energy received by transducer element 20, and outputs the processed signals, for example, to other circuitry or to the electronics unit of the ultrasound imaging system, via line 29. Lines 25 and 29 may each include one or more conductors carrying one or more signals to and from the unique transducer circuitry 10.

The unique transducer circuitry 10 of FIG. 1A also includes a high-voltage circuit 14, connected between a high supply voltage VH, typically in a range of approximately 20–100 volts, and ground. The high-voltage circuit 14 includes a high-voltage FET 24 to drive an ultrasound transducer element 20 via line 22, based on signals received from the low-voltage transmit circuit 12 via lines 26 and 28.

FIG. 1A also shows that the unique transducer circuitry 10 may optionally include a transmit-receive switch 16 operated by a control signal received on line 27. Transmit-receive switch 16 allows the ultrasound imaging system to use one ultrasound transducer element 20 for both transmitting and receiving ultrasound energy, as shown in FIG. 1A. Alternatively, the ultrasound imaging system may employ transducer elements that are dedicated to either transmitting or receiving ultrasound energy. For example, high-voltage circuit 14 may be connected directly to one ultrasound transducer element via line 22, and another ultrasound transducer element (not shown in FIG. 1A) may be connected directly to low-voltage receive circuit 18 via line 19.

According to a feature of the invention, at least one of the low-voltage circuits 12 and 18 and the high-voltage circuit 14 are monolithically fabricated on a single substrate, preferably using conventional low-voltage component fabrication processes, to form unique transducer circuitry 10.

Figure 1B:
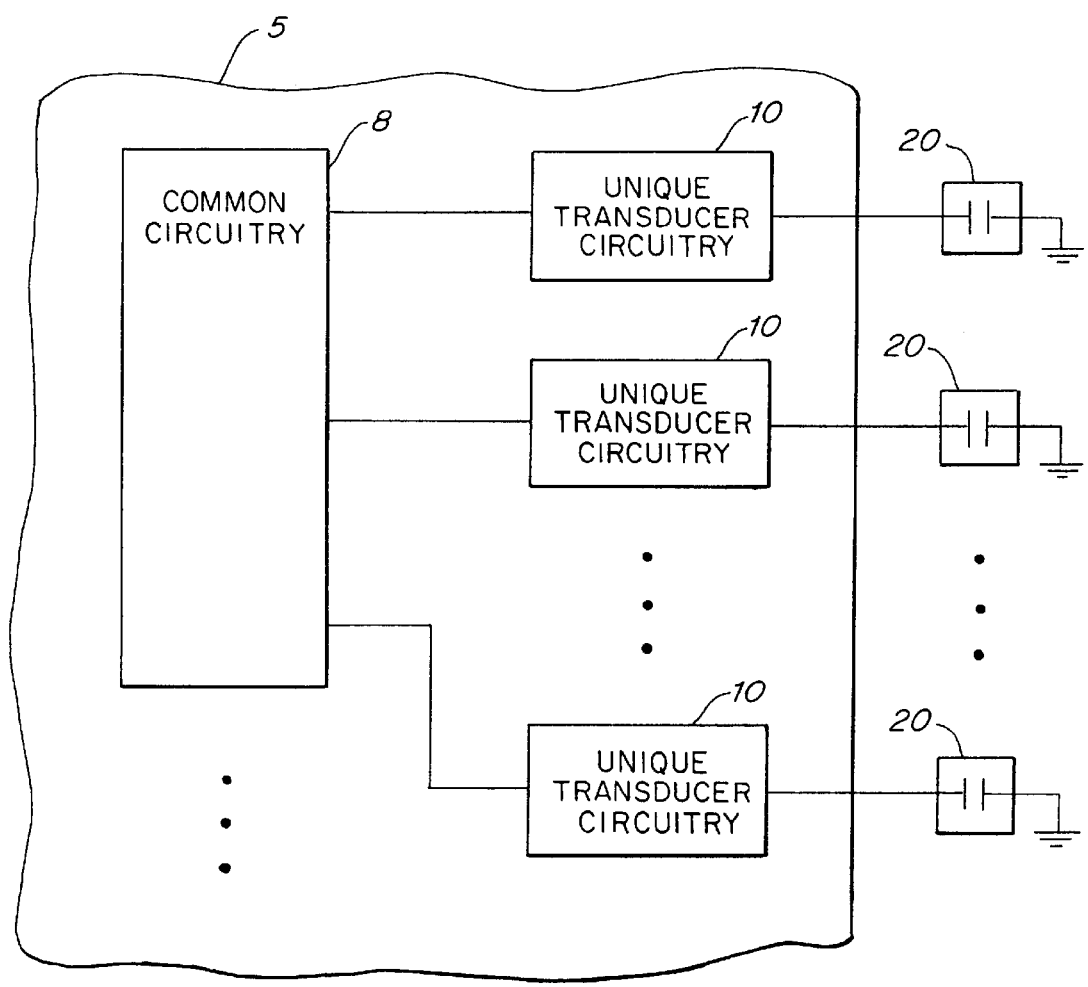
FIG. 1B is a block diagram of a portion of an integrated circuit included in an ultrasound transducer head and including the integrated circuitry of FIG. 1A.

FIG. 1A shows that the unique transducer circuitry 10 is associated with one ultrasound transducer element 20. As discussed above, the transducer head of an ultrasound imaging system preferably includes a large number of transducer elements. FIG. 1B shows an example of a portion of transducer head circuitry 5 that may be included in the transducer head of an ultrasound imaging system according to the invention. FIG. 1B illustrates that the transducer head circuitry 5 may include unique transducer circuitry 10 for each transducer element 20 of the imaging system. The transducer head circuitry 5 may also include one or more sections of common circuitry 8 that each provides signals to, and/or receives signals from, groups of unique transducer circuitry 10. Furthermore, the transducer head circuitry 5 may be partitioned in any desired manner into one or more integrated circuits. These integrated circuits may include high-voltage and low-voltage circuitry comprising both the common circuitry 8 and the unique transducer circuitry 10 for one or more transducer elements.

From FIG. 1B, it is readily appreciated that a high degree of integration of circuitry is desirable to provide transducer head circuitry 5 which will accommodate a large number of transducer elements 20, while nonetheless having a reasonable size that facilitates incorporation of the circuitry 5 into the small volume of the transducer head. Unique transducer circuitry 10 provides an advantageous degree of miniaturization by comprising both high and low-voltage components, thereby eliminating the need for discrete high-voltage transducer drivers located externally of the transducer head circuitry 5, or dedicated high-voltage integrated circuits including only high-voltage drivers. It should be appreciated, however, that it is not necessary to incorporate unique transducer circuitry 10 into the transducer head, and that the foregoing discussion is for purposes of illustration only.

Figure 2A:
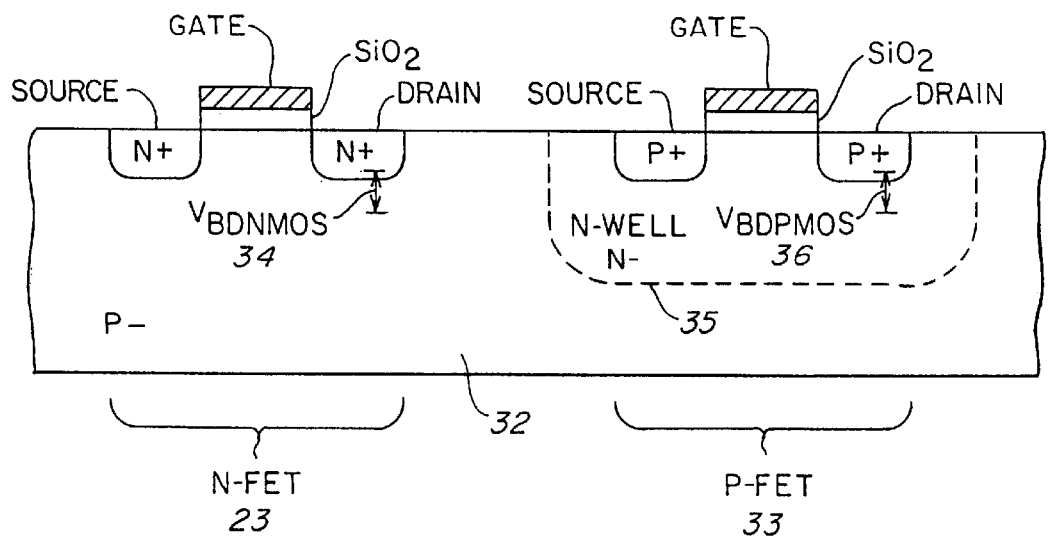
FIG. 2A is a cross-sectional view of a portion of a P-type semiconductor substrate showing conventional low-voltage CMOS components.
Figure 2B:
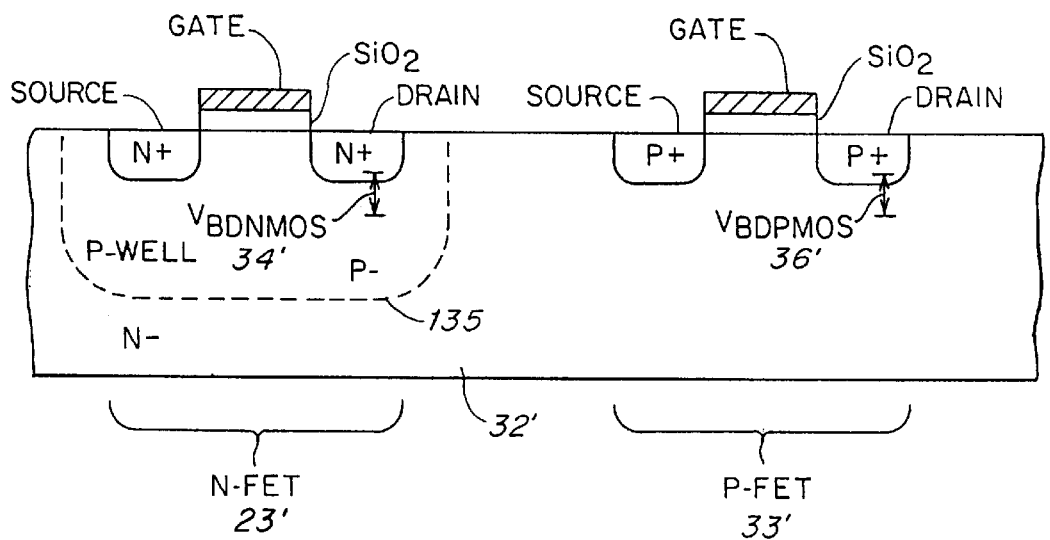
FIG. 2B is a cross-sectional view of a portion of an N-type semiconductor substrate showing conventional low-voltage CMOS components.

FIG. 2A shows a cross-sectional view of a portion of a P-type semiconductor substrate 32 in which low-voltage CMOS devices, such as NMOS transistor 23 (NFET) and PMOS transistor 33 (PFET), are fabricated, while FIG. 2B shows a cross-sectional view of a portion of an N-type semiconductor substrate 32' in which low-voltage CMOS devices, such as NMOS transistor 23' and PMOS transistor 33', are fabricated. Either or both of the low-voltage transmit circuit 12 and the low-voltage receive circuit 18 of FIG. 1A may include low-voltage CMOS devices as shown in FIGS. 2A and 2B.

FIG. 2A illustrates that the NMOS transistor 23 has an NMOS breakdown voltage 34 ($V_{BDNMOS}$) at a junction between the drain of the NMOS transistor and the substrate 32. Likewise, the PMOS transistor 33 has a PMOS breakdown voltage 36 ($V_{BDPMOS}$) at a junction between the drain of the PMOS transistor and n-well region 35 formed in the substrate 32.

Similarly, FIG. 2B illustrates that the NMOS transistor 23' has an NMOS breakdown voltage 34' ($V_{BDNMOS}$) at a junction between the drain of the NMOS transistor and a p-well region 135 formed in the substrate 32'. Likewise, the PMOS transistor 33' has a PMOS breakdown voltage 36' ($V_{BDPMOS}$) at a junction between the drain of the PMOS transistor and the substrate 32'. The low-voltage CMOS devices illustrated in FIGS. 2A and 2B typically have operating voltages of about 5 volts and breakdown voltages in a range of approximately 7–10 volts.

Figure 3A:
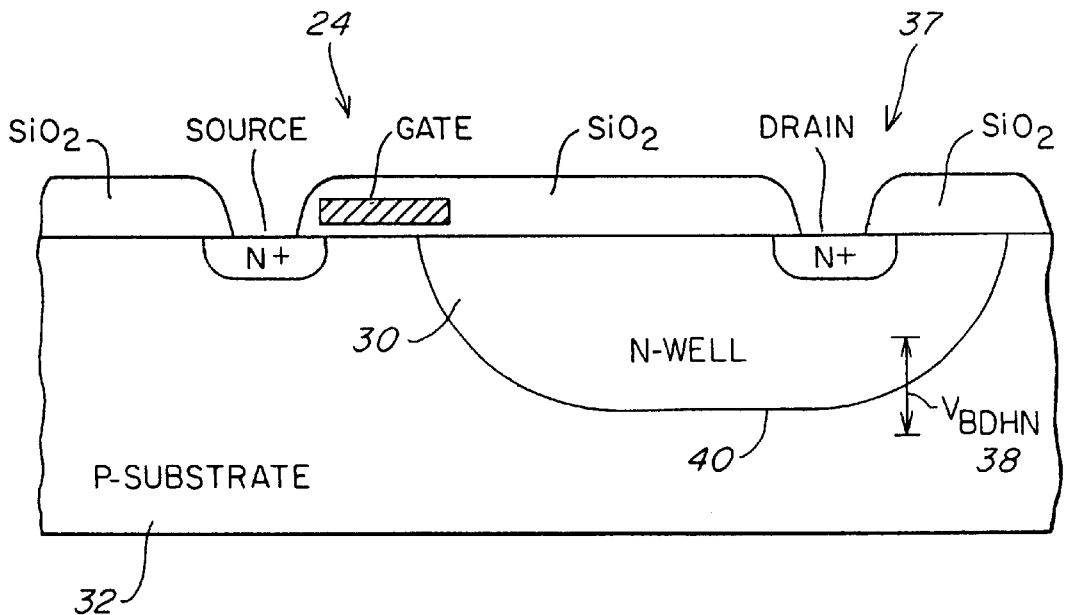
FIG. 3A is a cross-sectional view of a portion of a P-type semiconductor substrate including a high-voltage NMOS FET according to one embodiment of the invention.
Figure 4A:
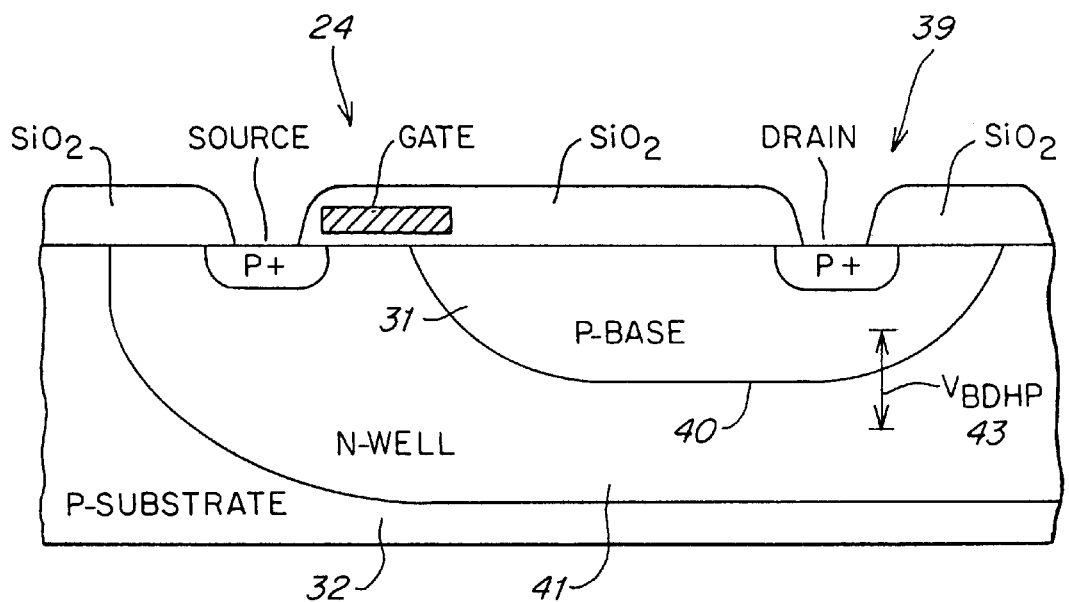
FIG. 4A is a cross-sectional view of a portion of a P-type semiconductor substrate including a high-voltage PMOS FET according to one embodiment of the invention.
Figure 3B:
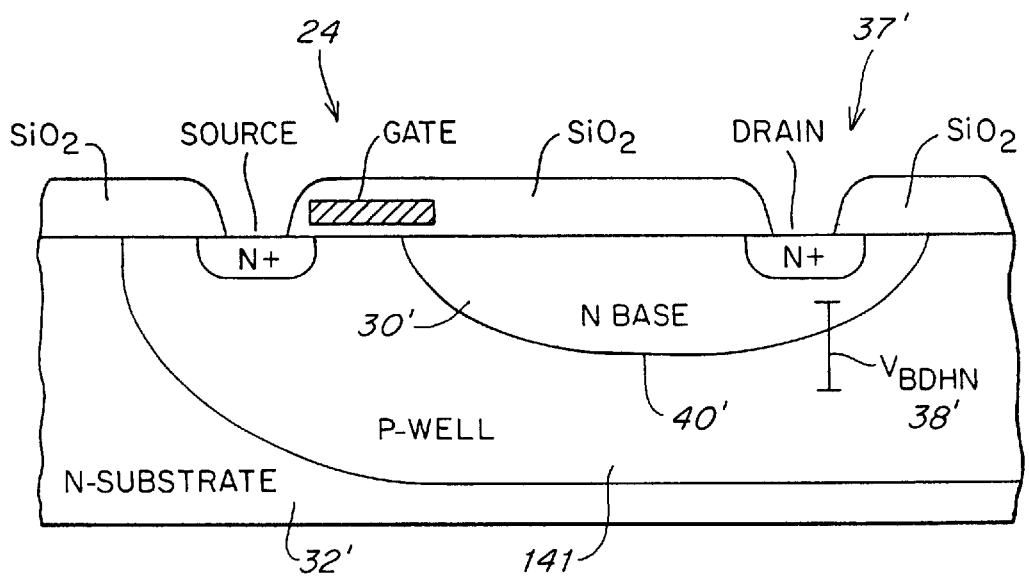
FIG. 3B is a cross-sectional view of a portion of an N-type semiconductor substrate including a high-voltage NMOS FET according to one embodiment of the invention.
Figure 4B:
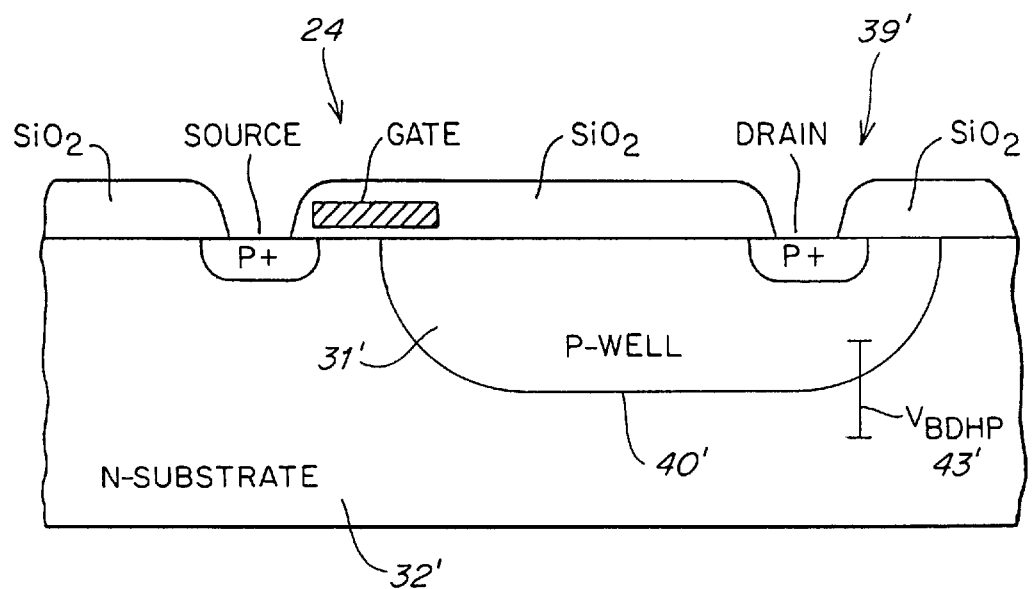
FIG. 4B is a cross-sectional view of a portion of an N-type semiconductor substrate including a high-voltage PMOS FET according to one embodiment of the invention.

FIGS. 3A and 4A show cross-sectional views of other portions of P-type semiconductor substrate 32 in which high-voltage devices are fabricated, while FIGS. 3B and 4B show cross-sectional views of other portions of N-type semiconductor substrate 32' in which high-voltage devices are fabricated, according to one embodiment of the invention. FIGS. 3A and 3B illustrate the structure of high-voltage NFETs 37 and 37', respectively, and FIGS. 4A and 4B illustrate the structure of high-voltage PFETs 39 and 39', respectively. The high-voltage FET 24 of the high-voltage circuit 14 of FIG. 1A may be any one of NFETs 37 and 37' or PFETs 39 and 39'.

As shown in FIGS. 3A and 4A, NFET 37 includes a lightly doped drain region 30 and PFET 39 includes a lightly doped drain region 31. The drain regions 30 and 31 are doped such that breakdown voltages 38 ($V_{BDHN}$) and 43 ($V_{BDHP}$) of the respective drain-substrate junctions 40 of the high-voltage FETs are greater than the breakdown voltage of the CMOS devices of FIG. 2A, for example, the NMOS breakdown voltage 34 and the PMOS breakdown voltage 36.

Similarly, as shown in FIGS. 3B and 4B, NFET 37' includes a lightly doped drain region 30' and PFET 39' includes a lightly doped drain region 31'. The drain regions 30' and 31' are doped such that breakdown voltages 38' ($V_{BDHN}$) and 43' ($V_{BDHP}$) of the respective drain-substrate junctions 40' of the high-voltage FETs are greater than the breakdown voltage of the CMOS devices of FIG. 2B, for example, the NMOS breakdown voltage 34' and the PMOS breakdown voltage 36'.

Examples of appropriate doping concentrations for the various semiconductor regions of the devices shown in FIGS. 3A, 3B, 4A and 4B include, but are not limited to, $4 \times 10^{14}$ cm$^{-3}$ for the substrate regions 32 and 32', $1 \times 10^{16}$ cm$^{-3}$ for the well regions 30, 41, 141 and 31', and $1 \times 10^{18}$ cm$^{-3}$ for the base regions 31 and 30'. Higher breakdown voltages for the NFETs 37 and 37' and the PFETs 39 and 39' allow such FETs to withstand higher operating voltages.

The device structures illustrated in FIGS. 3A, 3B, 4A and 4B are derived from conventional CMOS designs for MOS transistors and, as a result, these devices may be fabricated using conventional CMOS fabrication techniques and standard semiconductor materials, similarly to the low voltage devices shown in FIGS. 2A and 2B. For example, the n-well 30 of FIG. 3A and the n-base 30' of FIG. 3B may be fabricated similarly to that of the n-well 35 of FIG. 2A. Likewise, the p-base 31 of FIG. 4A and the p-well 31' of FIG. 4B may be fabricated similarly to that of the p-well 135 of FIG. 2B.

The devices shown in FIGS. 3A, 3B, 4A and 4B achieve high breakdown voltages primarily through the selection of appropriate doping levels for the various semiconductor regions. In general, as the doping concentration is increased in adjacent semiconductor materials of different conductivity types, a carrier depletion region at the junction of the materials becomes smaller, thereby reducing the breakdown voltage of the junction. Accordingly, by decreasing the doping concentration in the drain region, the breakdown voltage of the drain-substrate junction in each of the high voltage FETs is increased. As a secondary consideration, the larger geometries of the drains 30, 31, 30' and 31' increase the radius of curvature of the respective drain-substrate junctions 40 and 40', thereby reducing a peak electric field at each of the junctions 40 and 40' and hence further contributing to an increase in each of the breakdown voltages 38, 43, 38' and 43' of the devices.

As an example of breakdown and operating voltages of the high voltage devices relative to conventional CMOS devices, using approximately the doping concentrations discussed above, the high-voltage devices shown in FIGS. 3A and 4A have breakdown voltages 38 and 43 of approximately 120 volts for the NFET 37 and approximately –30 volts for the PFET 39, and therefore have operating voltages of up to approximately 100 volts and –25 volts, respectively. The PFET 39 shown in FIG. 4A exhibits a lower breakdown voltage 43 than the breakdown voltage 38 of the NFET 37 shown in FIG. 3A primarily because of the higher doping concentrations of drain region 31 and n-well region 41, as compared to the doping concentrations of drain region 30 and substrate 32. For the same reason, assuming doping concentrations similar to those discussed in the example above, NFET 37' shown in FIG. 3B would exhibit a lower breakdown voltage than PFET 39' of FIG. 4B. Nevertheless, the high-voltage NFET and PFET breakdown voltages are substantially greater than the respective CMOS breakdown voltages of the low-voltage devices of FIGS. 2A and 2B.

Accordingly, the device structures shown in FIGS. 3A, 3B, 4A, and 4B achieve high-voltage operation using standard CMOS fabrication processes, which render such high-voltage devices easily integrated with low-voltage circuitry. In particular, such devices eliminate the need for discrete high-voltage components or dedicated high-voltage fabrication processes for circuitry associated with ultrasound imaging systems.

In view of the foregoing, some examples of ultrasound transducer circuitry 10 shown in FIG. 1A will now be discussed. It should be appreciated that, in the circuit examples described throughout this disclosure, certain terminology referring to voltage supplies, transistor conductivity types and circuit elements is used for purposes of illustration only, and is not intended to be limiting. Specifically, while voltage supply connections and descriptive terms such as "pull-up" or "pull-down" may be specified in connection with a particular choice of transistor conductivity type for the various transistors of the circuits, it is readily understood that the circuits described herein will function equivalently for an alternate choice of transistor conductivity type for each transistor, with appropriate voltage supply connections.

Figure 5:
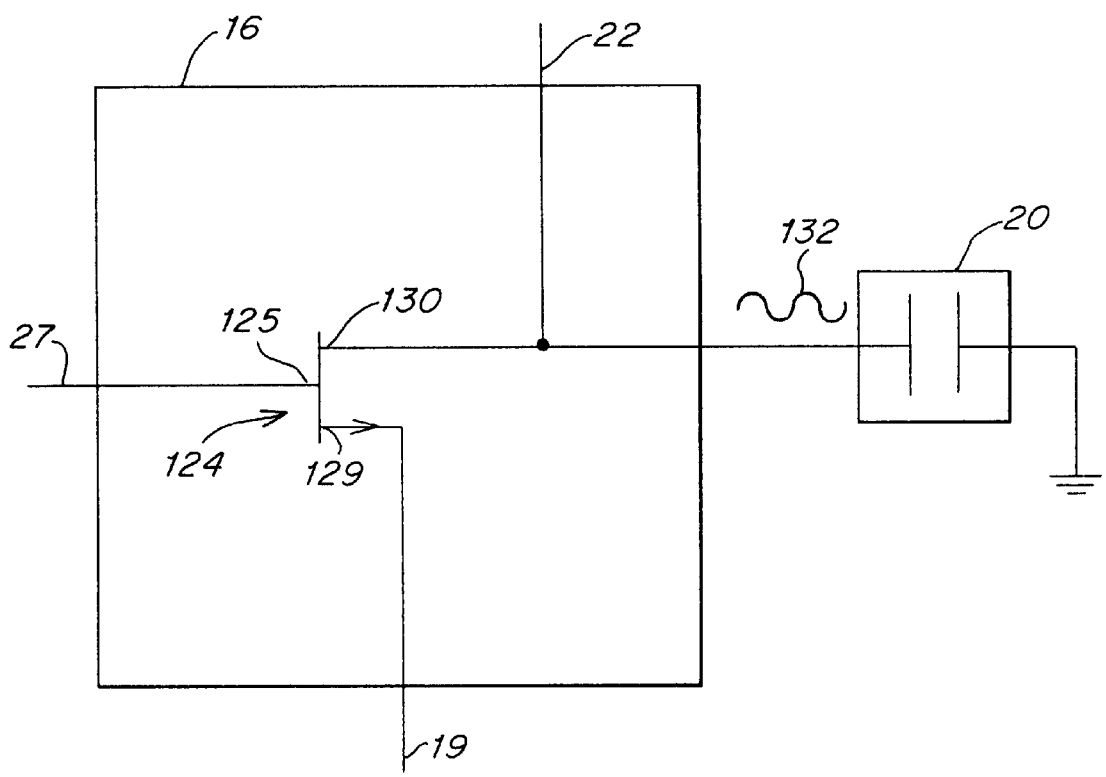
FIG. 5 is a schematic diagram of an example of a transmit-receive switch shown in FIG. 1A according to one embodiment of the invention.

With reference again to FIG. 1A, an example of the optional transmit-receive switch 16 of the unique transducer circuitry 10, according to one embodiment of the invention, is illustrated in FIG. 5. In FIG. 5, the transmit-receive switch 16 includes a high voltage FET 124, similar to those described above in connection with FIGS. 3A–B and 4A–B. While the particular example of FIG. 5 shows an NFET for high voltage FET 124, any of the devices of FIGS. 3–4 are suitable for the transmit-receive switch 16. FIG. 5 shows that a control signal received on line 27 is applied to the gate 125 of the high voltage FET 124, the line 19 is connected to the source 129 of the high voltage FET 124, and the line 22 and the ultrasound transducer element 20 are both connected to the lightly doped drain 130 of the high voltage FET 124.

In FIG. 5, when the high voltage FET 124 is activated to conduct current, by the application of a control signal applied to the gate 125 via line 27, a signal 132 from the ultrasound transducer element 20 will be electrically coupled to the line 19. During activation of the high voltage FET 124, the high voltage circuit 14 is not activated and line 22 "floats;" namely, line 22 carries no signal and is electrically decoupled from high voltage circuit 14. When the high voltage FET 124 is not activated, line 19 is electrically decoupled from the ultrasound transducer element 20, and the high voltage circuit 14 may drive the ultrasound transducer element 20 via line 22.

Figure 6A:
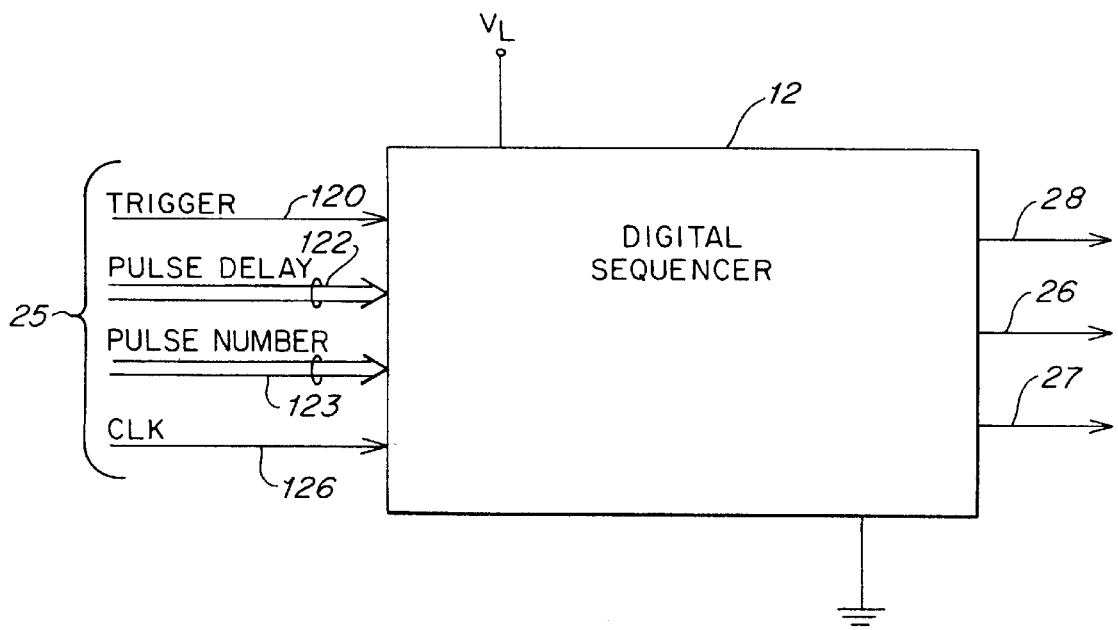
FIG. 6A is a block diagram showing input and output signals of a digital sequencer included in the low-voltage transmit circuit shown in FIG. 1A according to one embodiment of the invention.

An example of the low-voltage transmit circuit 12 of FIG. 1A, according to one embodiment of the invention, includes high-density digital logic circuitry electrically coupled to the high-voltage circuit 14. FIG. 6A shows such an example of a low-voltage transmit circuit including high density digital logic circuitry, as a digital sequencer 12. The digital sequencer 12 of FIG. 6A receives control signals, for example, from other circuitry in the transducer head or from an electronics unit of an ultrasound imaging system (not shown) via lines 25. FIG. 6A shows that the control signals received via lines 25 may include a trigger signal 120, one or more pulse delay signals 122, one or more pulse number signals 123, and a clock signal 126. The digital sequencer 12 outputs one or more low-voltage transmit signals to high-voltage circuit 14, shown in FIG. 1A, via lines 26 and 28 and outputs a control signal via line 27 to the optional transmit-receive switch 16, also shown in FIG. 1A.

Figure 6B:
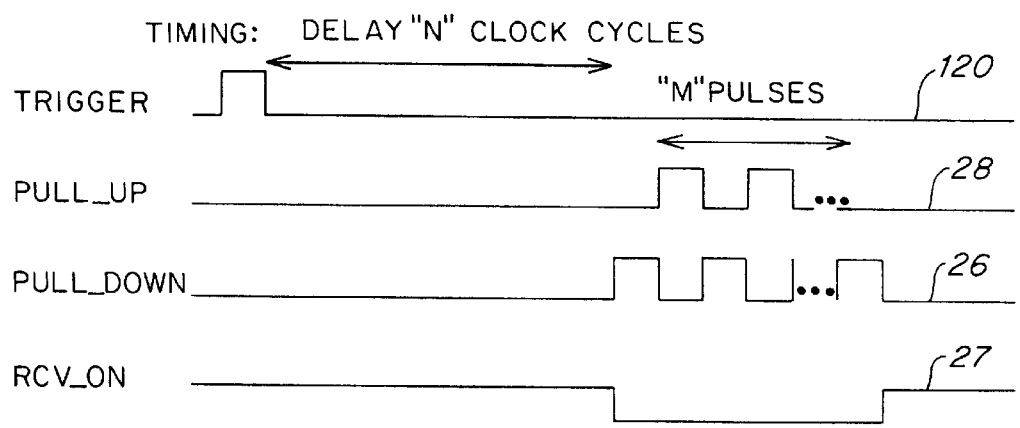
FIG. 6B is a relative timing diagram of the input and output signals associated with the digital sequencer of FIG. 6A.

FIG. 6B shows a relative timing diagram of the input and output signals associated with the digital sequencer 12 shown in FIG. 6A. Once trigger signal 120 is received by digital sequencer 12, the digital sequencer counts a predetermined number of cycles N of clock 126, as instructed by pulse delay signals 122. Following this delay of N-clock cycles, the digital sequencer 12 outputs a series of M-pulses on lines 26 and 28 as instructed by pulse number signals 123. The M-pulses are shown in FIG. 6B by signals "PULL-UP" and "PULL-DOWN". Digital sequencer 12 also toggles the control signal RCV_ON, output on line 27 to the transmit-receive switch, to direct the pulses output on lines 26 and 28 to an ultrasound transducer element.

Figure 6C:
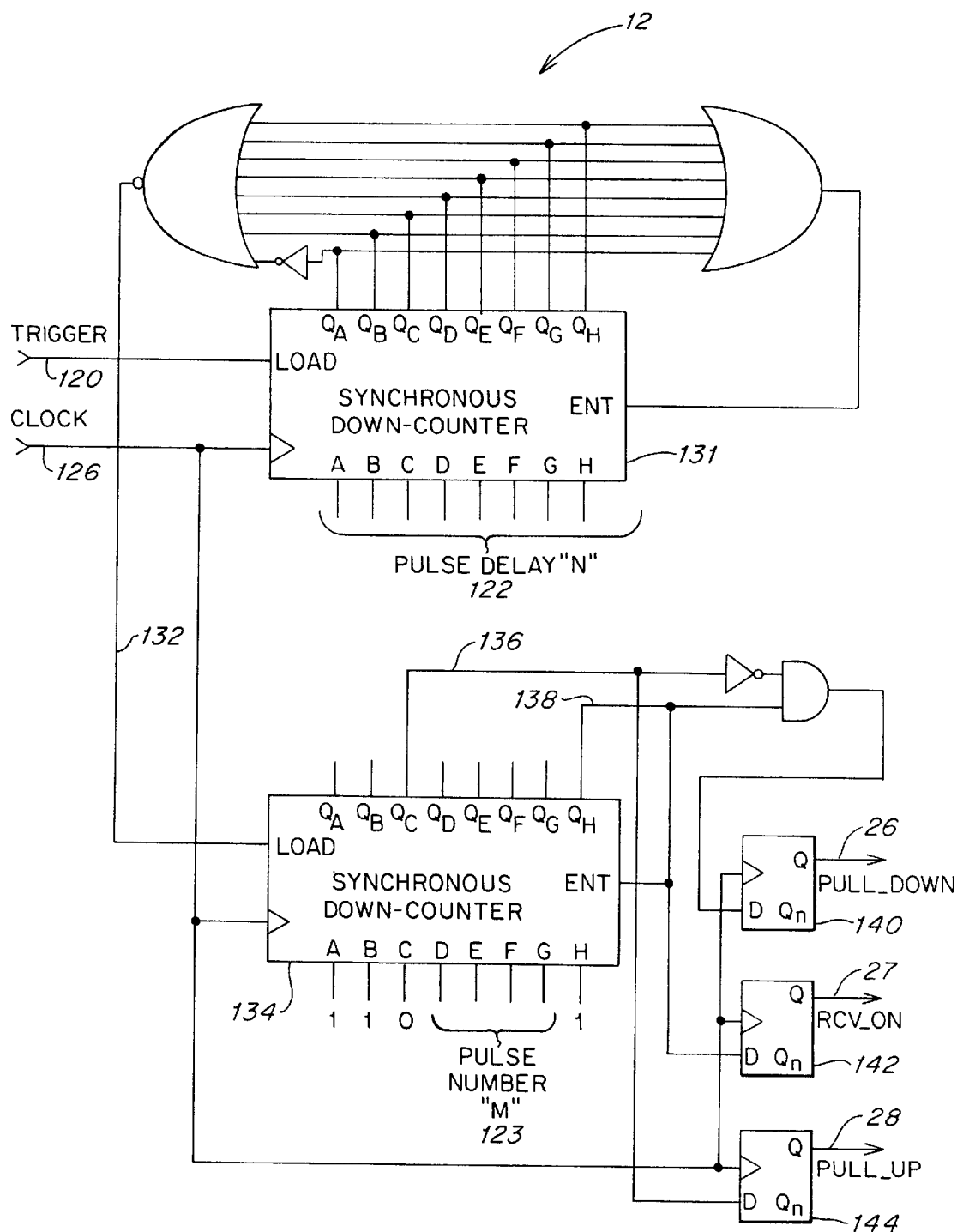
FIG. 6C is a more detailed schematic diagram of one example of the digital sequencer of FIG. 6A.

FIG. 6C is a schematic diagram of one example of the digital sequencer 12 of FIG. 6A. As shown in FIG. 6C, a synchronous downcounter 131 counts cycles of clock 126 for the number N, as instructed by pulse delay signals 122, and outputs a signal 132 after N clock cycle counts. A second synchronous downcounter 134 receives the signal 132 and outputs a number M of pulses on lines 136 and 138, as instructed by pulse number signals 123. Signals on lines 136, 138, and clock signal 126 operate flip-flops 140, 142, and 144 to output the transmit signal pulses PULL_DOWN and PULL_UP on lines 26 and 28, respectively, and the control signal RCV_ON on line 27.

Figure 7A:
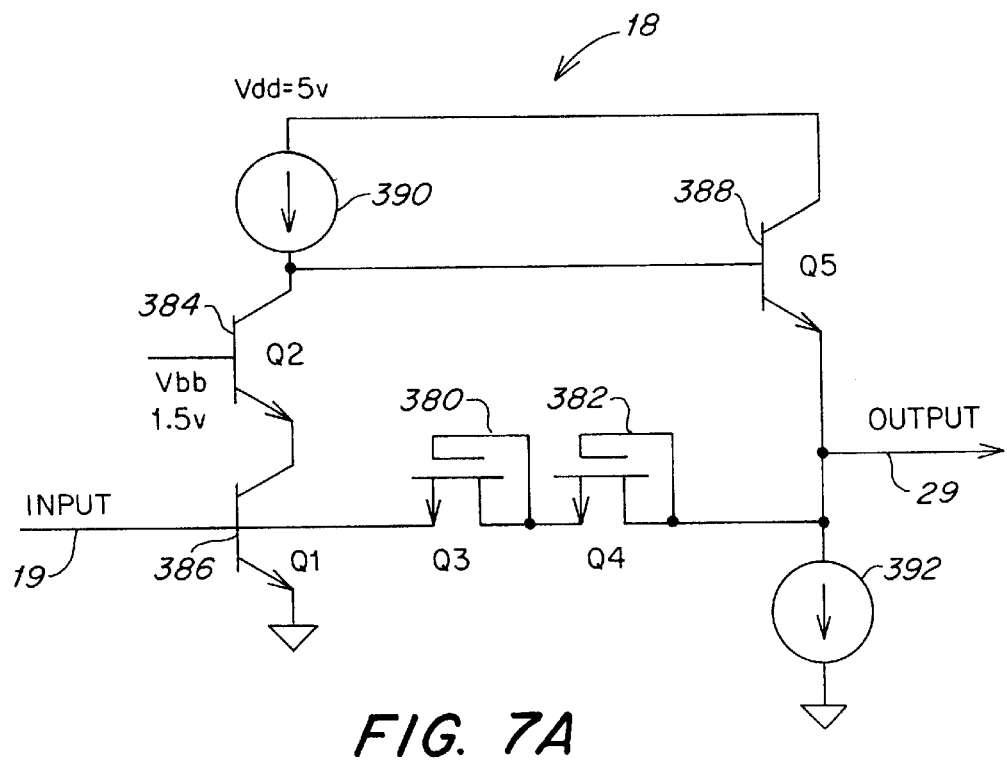
FIG. 7A is a schematic diagram of one example of the low-voltage receive circuitry shown in FIG. 1A according to one embodiment of the invention.
Figure 7B:
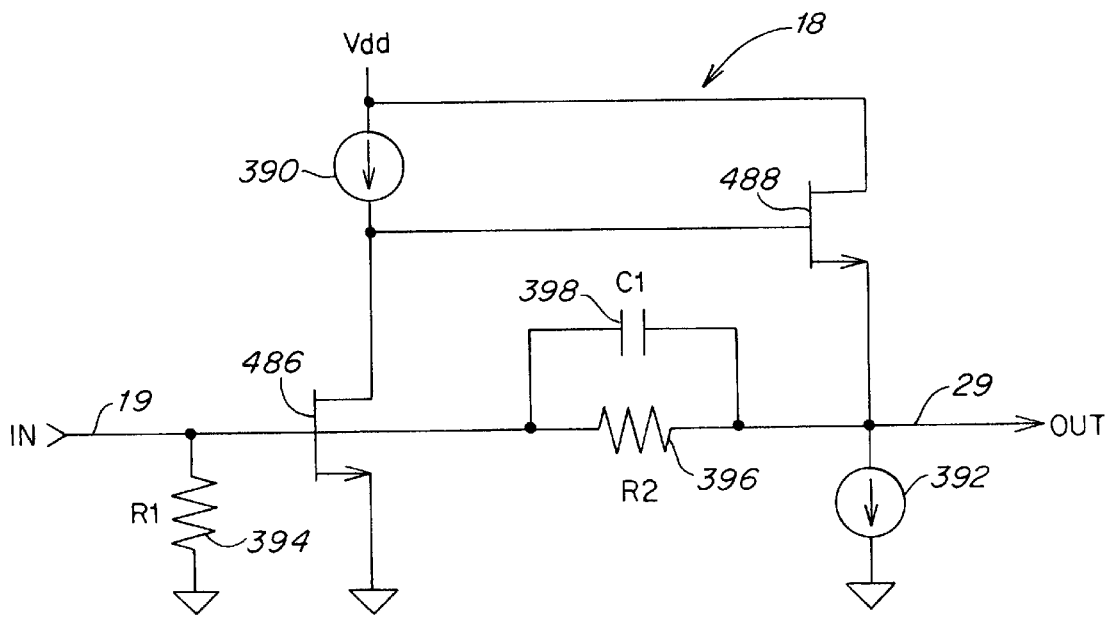
FIG. 7B is a schematic diagram of another example of the low-voltage receive circuitry shown in FIG. 1A.

With reference again to FIG. 1A, the unique transducer circuitry 10 may include a low-voltage receive circuit 18. An example of low-voltage receive circuit 18 may include low noise analog receive circuitry to process signals, input via line 19, that represent ultrasound energy received by a transducer element. FIGS. 7A and 7B are schematic diagrams of examples of the low-voltage receive circuit 18 of FIG. 1A.

In the receive circuit shown in FIG. 7A, transistors 380 and 382 act as diodes in series with a high resistance that clamps the output bias voltage at line 29 at two FET thresholds plus a 0.7 $V_{BE}$ drop. Cascode transistor 384 reduces the Miller effect of input transistor 386 which receives signals from the ultrasound transducer element via line 19. Transistor 388 acts as a low impedance output driver. Current sources 390 and 392 may be formed by FET current mirrors that copy the current from an external reference current (not shown).

FIG. 7B shows another example of a low voltage, low noise analog receive circuit 18, wherein input transistor 486 and output driver 488 are shown as FETS which replace the bipolar junction transistors 386 and 388, respectively, shown in FIG. 7A. In the circuit of FIG. 7B, diode coupled transistors 380 and 382 of FIG. 7A are replaced by a resistor 396 ($R_2$) and a capacitor 398 ($C_1$) connected in parallel. Resistors 394 ($R_1$) and 396 ($R_2$) of FIG. 7B set the input and output DC bias voltages on lines 19 and 29, respectively, and capacitor 398 ($C_1$) determines the gain of the circuit.

Figure 8:
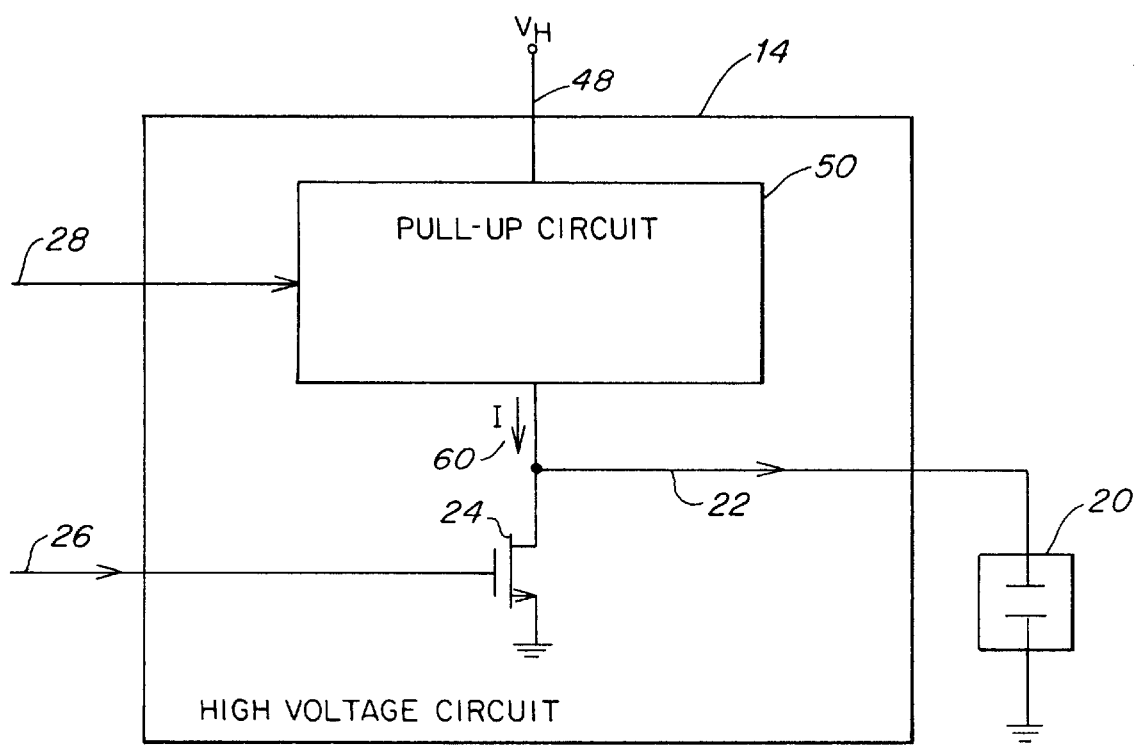
FIG. 8 is a block diagram of an example of the high-voltage circuit shown in FIG. 1A according to one embodiment of the invention.

FIG. 8 is a simplified block diagram of the high-voltage circuit 14 shown in FIG. 1A, according to one embodiment of the invention. For purposes of illustration, the high-voltage circuit 14 is shown in FIG. 8 coupled directly to the ultrasound transducer 20 via line 22. As shown in FIG. 1A and discussed above, the high-voltage circuit 14 may alternatively be coupled to a transmit-receive switch 16, which in turn directs signals output from the high-voltage circuit 14 to the ultrasound transducer element 20.

The high-voltage circuit 14 of FIG. 8 includes a high-voltage FET 24 to drive ultrasound transducer element 20, and a pull-up circuit 50 electrically coupled between a high-voltage 48 ($V_H$) and the high-voltage FET 24 to provide a drive current 60 to the ultrasound transducer element 20. As discussed earlier, high voltage 48 is typically in a range of approximately 20–100 volts. FIG. 8 also shows that lines 28 and 26 from the low-voltage transmit circuit 12 of FIG. 1A are respectively coupled to the pull-up circuit 50 and the high-voltage FET 24.

Typically, the high-voltage circuit 14 is used with ultrasound transducer elements by applying opposite-phase pulsed signals on lines 26 and 28. For example, when a signal on line 28 controls pull-up circuit 50 to provide current drive 60 to the transducer element 20, a signal on line 26 maintains the high-voltage FET 24 in an "off" or non-conducting state. When a signal on line 26 maintains high-voltage FET 24 in an "on" or conducting state (pull-down the voltage on line 22 to ground), a signal on line 28 controls pull-up circuit 50 to be in an "off" or non-conducting state.

Figure 9:
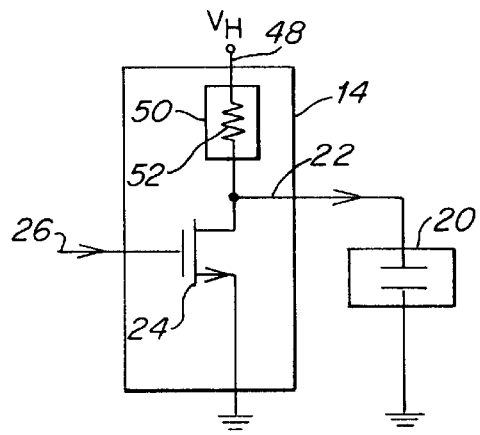
FIGS. 9–15 are schematic diagrams showing examples of the pull-up circuit of the high-voltage circuit shown in FIG. 7.
Figure 10:
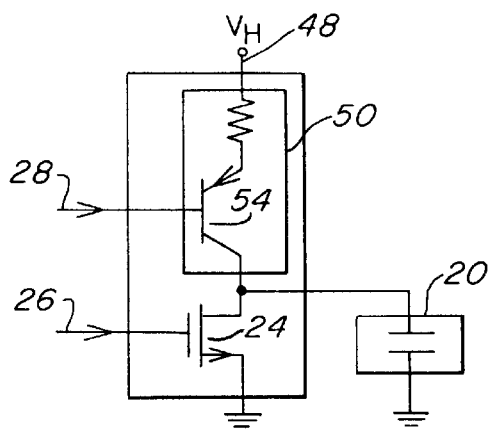
Figure 11:
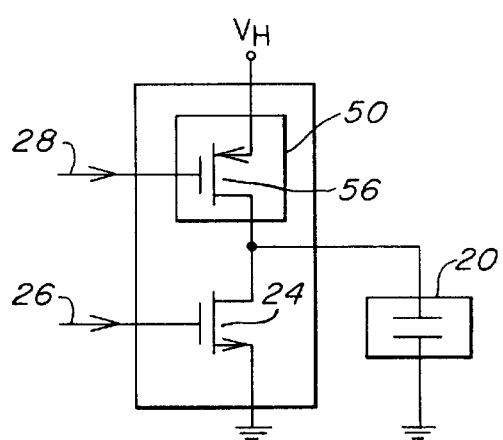

FIGS. 9–15 illustrate several examples of the pull-up circuit 50 shown in FIG. 8. FIG. 9 shows that the pull-up circuit 50 may include one or more resistors 52. In the example of FIG. 9, only line 26 is shown as coupling the high-voltage circuit 14 to the low-voltage transmit circuit 12, because the pull-up circuit 50 comprises a "passive" or non-controllable device in the form of resistor 52. FIGS. 10 and 11 show that pull-up circuit 50 may include one or more "active" or controllable devices. For example, FIG. 10 shows that pull-up circuit 50 may include one or more bipolar junction transistors 54 coupled to line 28, and FIG. 11 shows that pull-up circuit 50 may include one or more FETS 56 coupled to line 28. If multiple bipolar junction transistors or FETS are employed in the pull-up circuit 50, they may be interconnected in a variety of series or parallel configurations, some examples of which are discussed below. Additionally, the transistors of pull-up circuit 50 may be high-voltage components. For example, FET 56 of the pull-up circuit 50 shown in FIG. 11 may be a high-voltage FET, as discussed above in connection with FIGS. 3 and 4.

Figure 12:
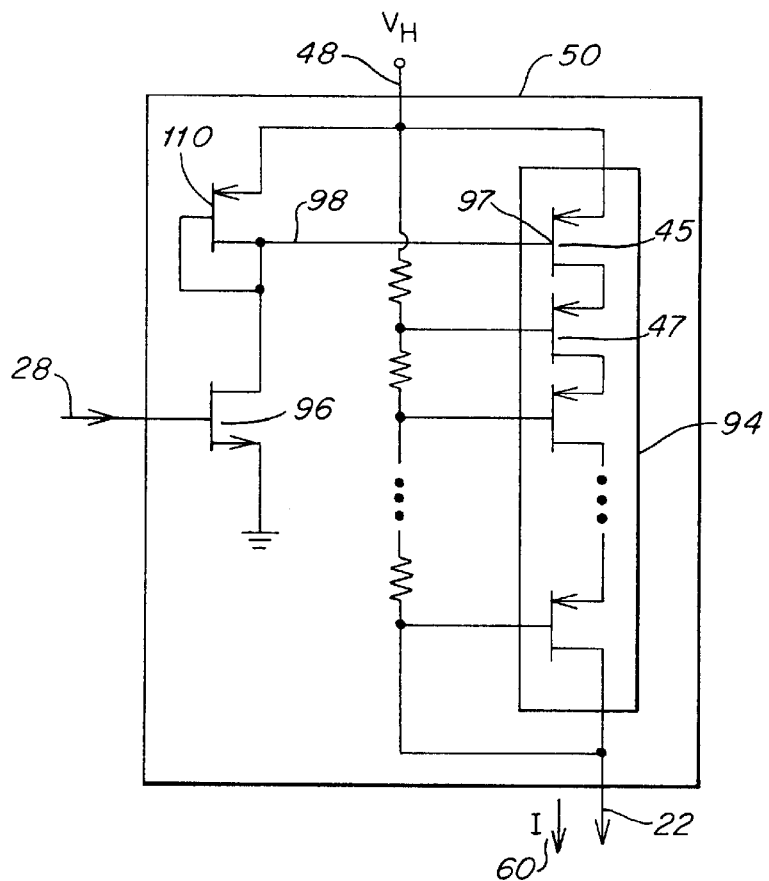

FIG. 12 is a schematic diagram of an example of pull-up circuit 50 employing multiple transistors. The pull-up circuit 50 of FIG. 12 includes a cascoded series configuration 94 of at least two pull-up transistors 45 and 47. Transistor 45 of the cascoded series electrically couples the configuration 94 to the high voltage 48, and has a pull-up control gate 97. The cascoded series configuration 94 outputs the drive current 60 based on a drive signal 98 input to the pull-up control gate 97. The circuit of FIG. 12 includes a gate drive transistor 96 to receive an input signal on line 28 from the low-voltage circuit 12 of FIG. 1A and to output the drive signal 98 to the pull-up control gate 97. Transistors 110 and 45 form a current mirror, and gate drive transistor 96 injects current into the current mirror based on the input signal on line 28.

In the pull-up circuit 50 of FIG. 12, the pull-up transistors are arranged in the cascoded series configuration 94 so as to each withstand, across their respective drain and source terminals, a portion of a voltage difference between the high voltage 48 and a voltage potential on line 22 (for example, ground) when the cascoded series configuration is in a non-conducting state. For this purpose, as in FIG. 11, high-voltage FETs may be employed for the pull-up transistors in the circuit of FIG. 12. As discussed in connection with FIGS. 3A and 4A, while high-voltage NFETs according to the invention may have breakdown voltages on the order of 120 volts, high-voltage PFETs may have breakdown voltages on the order of −30 volts. Accordingly, if the high voltage 48 is selected to be, for example, approximately 100 volts, and if the pull-up transistors are high-voltage PFETs, four high-voltage PFETs cascoded in series would be required for the configuration 94 of the pull-up circuit in FIG. 12, where each PFET withstands a voltage difference of approximately 25 volts.

It should be readily appreciated that the above example is for purposes of illustration only, to demonstrate that for the circuit of FIG. 12 and for similar circuits, an appropriate number of pull-up transistors for the cascoded series configuration 94 is a function of both the high voltage 48 and the breakdown voltage of each transistor, based on the type of pull-up transistors used in the cascoded series configuration. Furthermore, it should be appreciated that while FIG. 12 shows PFET transistors for the pull-up transistors 45 and 47 and an NFET transistor for the gate drive transistor 96, the transistor conductivity types (NFET/PFET) may be interchanged along with the conductivity type of the high-voltage FET 24 that drives the ultrasound transducer element 20, as discussed above in connection with FIGS. 3 and 4, and the pull-up circuit 50 functions equivalently.

Figure 13:
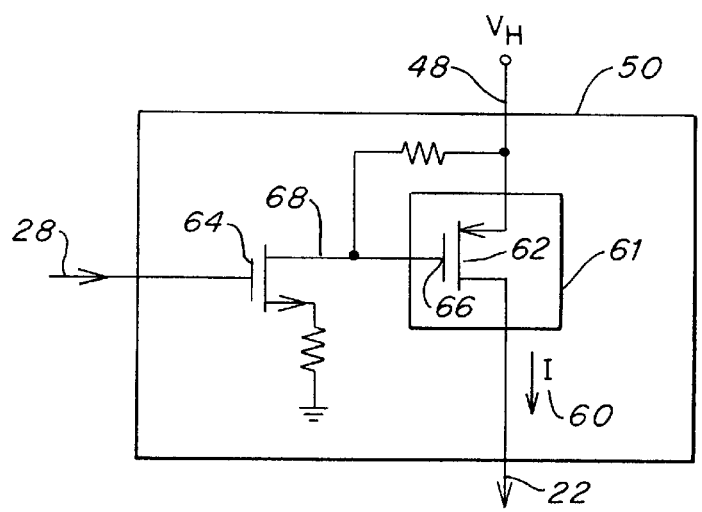

FIG. 13 shows another example of the pull-up circuit 50 employing multiple transistors. The circuit of FIG. 13 includes a pull-up transistor circuit 61 electrically coupled to the high-voltage 48, comprising at least one pull-up transistor 62 having a pull-up control gate 66, to output the drive current 60 based on a drive signal 68 input to the pull-up control gate 66. If circuit 61 includes more than one pull-up transistor 62, each pull-up transistor has a pull-up control gate and is connected in series with another pull-up transistor. The drive signal 68 is input to the pull-up control gate of each pull-up transistor.

The circuit of FIG. 13 also includes a gate drive transistor 64 for each pull-up transistor 62. Each gate drive transistor 64 receives an input signal on line 28 from the low-voltage circuit 12 of FIG. 1A and outputs the drive signal 68 to the pull-up control gate 66 of a respective pull-up transistor 62. For example, if the at least one pull-up transistor 62 includes two or more series-connected pull-up transistors, as shown in FIGS. 14 and 15 (discussed below), each transistor in the series has an associated gate drive transistor similar to transistor 64.

By including a gate drive transistor 64 for each pull-up transistor 62 in pull-up transistor circuit 61, the pull-up circuit 50 of FIG. 13 improves upon the pull-up circuit of FIG. 12 in that each pull-up transistor 62 of FIG. 13 has a more predictable gate-source voltage $V_{gs}$ than each pull-up transistor of the cascoded series configuration 94 shown in FIG. 12. Moreover, the pull-up circuit 50 of FIG. 13 reduces leakage current in each pull-up transistor 62, as compared to the pull-up transistors of the cascoded series configuration 94 of FIG. 12, by insuring that each pull-up transistor 62 turns completely off when gate drive transistor 64 is off. For the pull-up circuit 50 of FIG. 13, the pull-up transistors 62 and the gate drive transistors 64 may be high-voltage FETs, as discussed above in connection with FIGS. 3 and 4.

Figure 14:
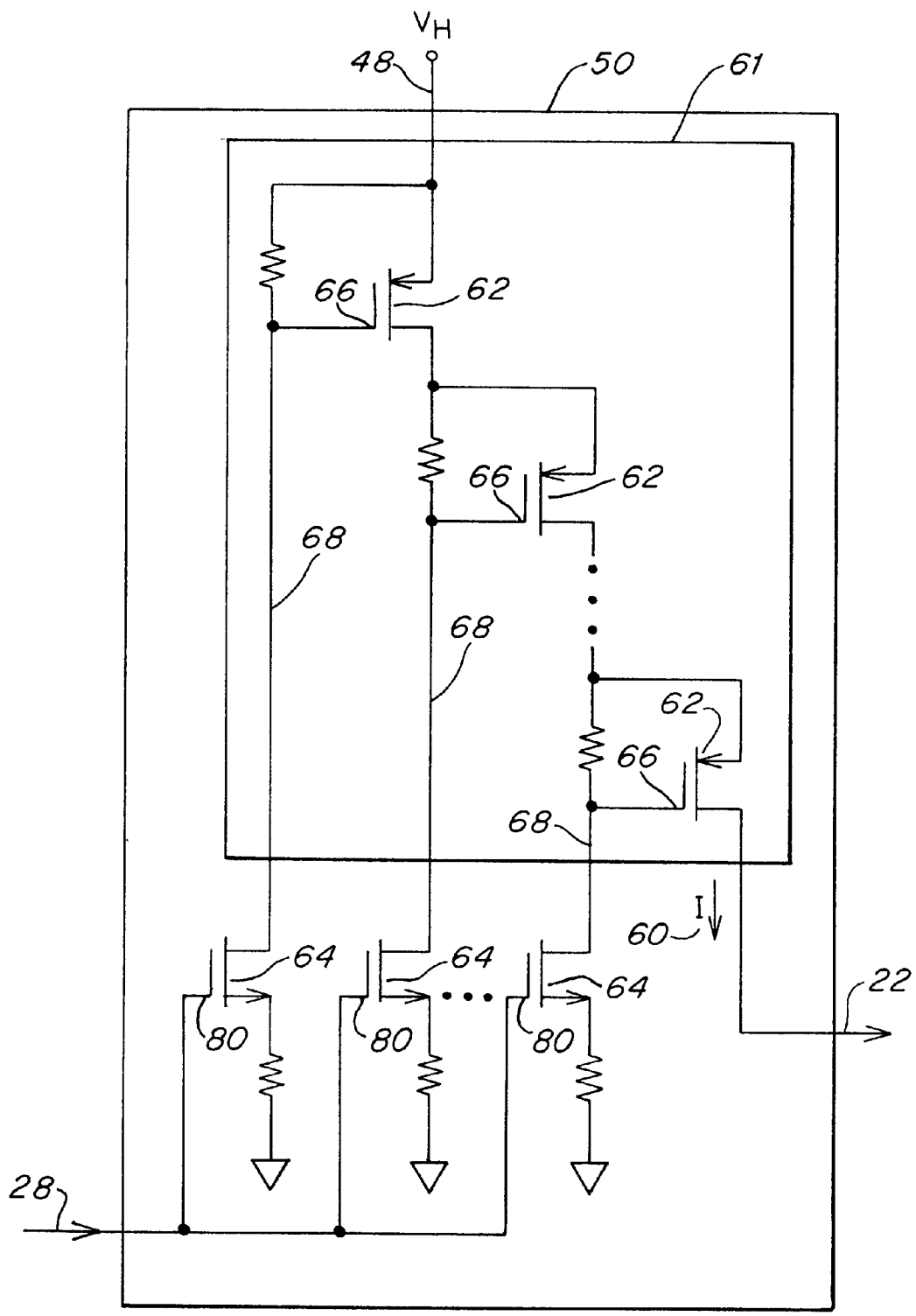
Figure 15:
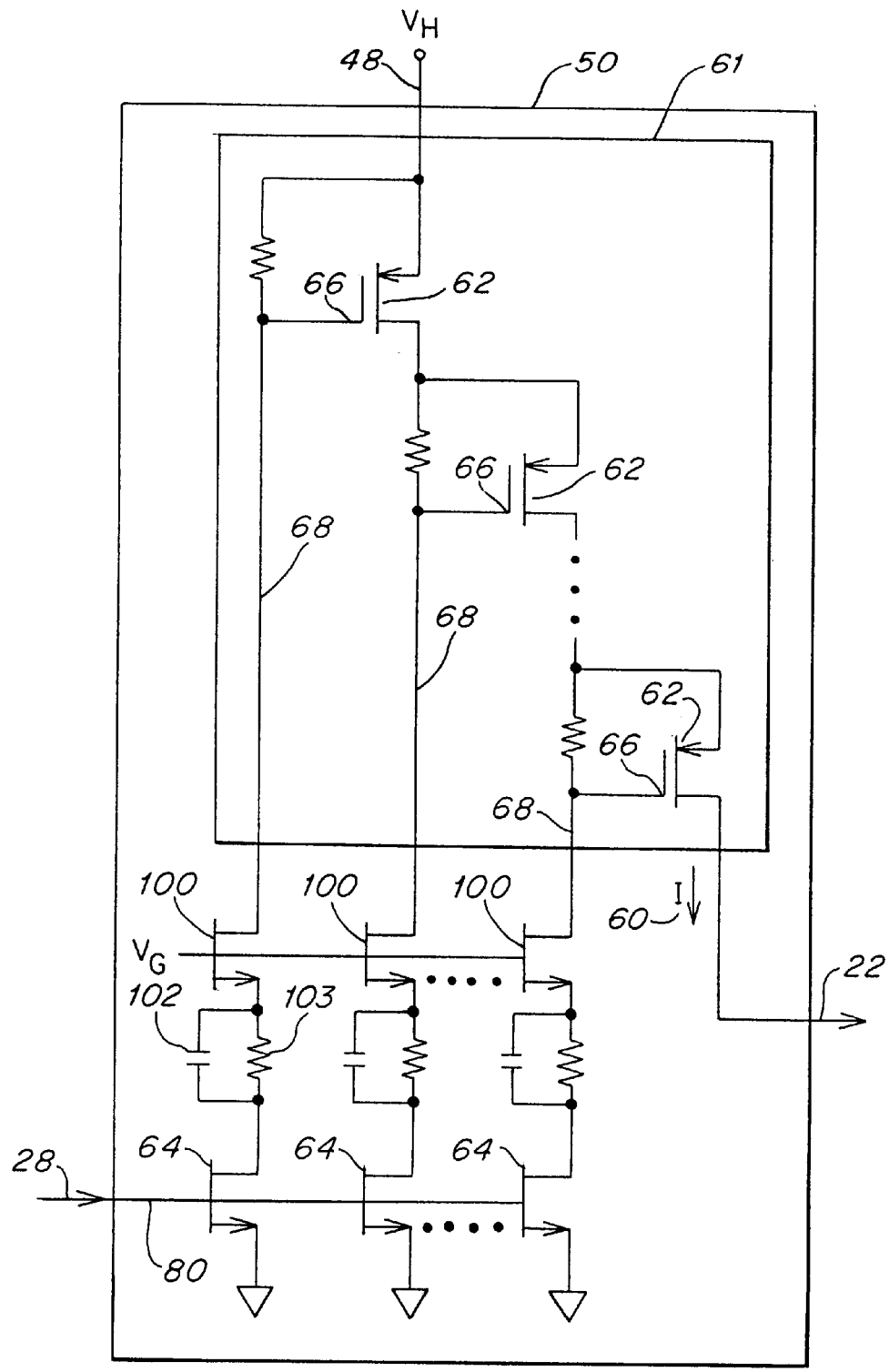

FIGS. 14 and 15 are schematic diagrams of two additional examples of the pull-up circuit 50, based on the simplified circuit illustrated in FIG. 13. In both FIGS. 14 and 15, the pull-up transistor 62 of FIG. 13 is replaced with a plurality of pull-up transistors cascoded in series, and one transistor of the series is coupled to the high-voltage 48. Similarly, the gate drive transistor 64 of FIG. 13 is replaced with a plurality of gate drive transistors 64 in FIGS. 14 and 15. Each gate drive transistor 64 of FIGS. 14 and 15 includes a control gate 80 to receive the input signal on line 28 from the low-voltage circuit 12 of FIG. 1A. Each gate drive transistor 64 outputs the drive signal 68 to the pull-up control gate 66 of one of the plurality of pull-up transistors 62. As in the circuit of FIG. 13, the pull-up transistors 62 and the gate drive transistors 64 may be high-voltage FETs.

The circuit of FIG. 15 includes at least one high-voltage FET level shifter 100 for each pull-up transistor 62. In the case where high-voltage FETs are used for pull-up transistors 62, high-voltage FET level shifters 100 may be employed, as illustrated in the circuit of FIG. 15, to withstand a significant portion of high voltage 48, thereby "shifting" the voltage level of high voltage 48 to a lower voltage compatible with standard CMOS devices. As a result, gate drive transistors 64 may be conventional low-voltage CMOS transistors and hence, have a more well-defined threshold voltage than the high-voltage FETs.

Additionally, FIG. 15 shows a compensation capacitor 102 connected in parallel with a resistor 103 for each gate drive transistor 64. Capacitors 102 compensate for a gate capacitance of the pull-up transistors 62 so as to increase the speed (response time) of the pull-up circuit 50. Each parallel-connected capacitor 102 and resistor 103 is connected between a gate drive transistor 64 and a level shifter 100. Each level shifter 100 is connected to a respective pull-up transistor 62.

Figure 16:
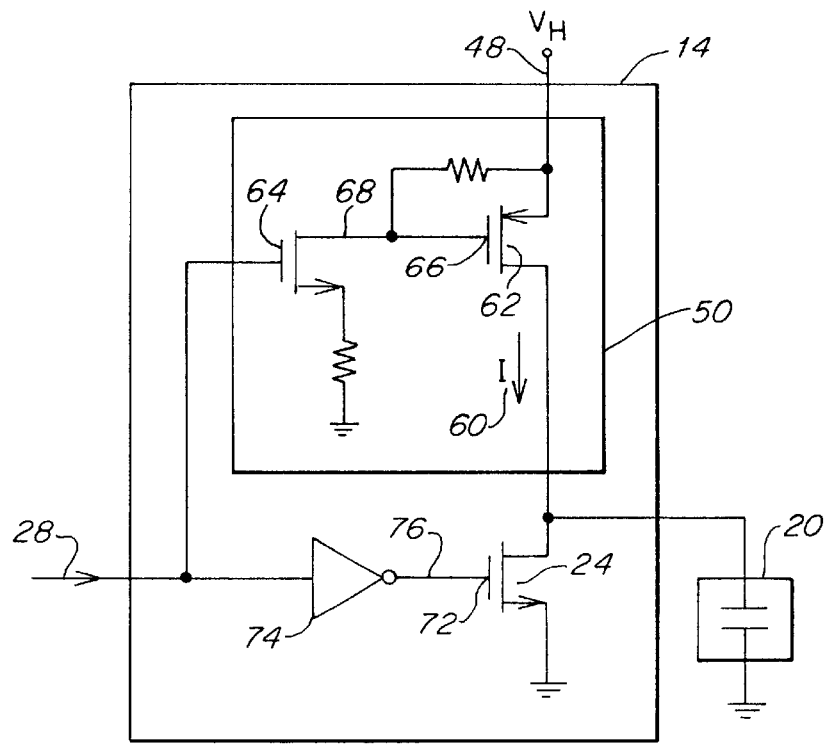
FIG. 16 is a schematic diagram of the high-voltage circuit shown in FIG. 1A according to another embodiment of the invention.

FIG. 16 shows another embodiment of the high-voltage circuit 14 of FIG. 1A. Pull-up circuit 50 is shown for purposes of illustration using the example of FIG. 13. The high-voltage circuit 14 of FIG. 16 requires only one input signal via line 28 from the low-voltage transmit circuit 12 of FIG. 1A, and includes an inverter 74 to receive the input signal on line 28 and output a transmit drive signal 76 to a driver control gate 72 of the high-voltage FET driver 24. In this manner, only one signal from the low-voltage transmit circuit 12 simultaneously controls both the pull-up circuit 50 and the high-voltage FET 24 such that only one of circuit 50 and FET 24 are in an "on" or conducting state at any instant. The inverter 74 may be implemented, for example, as a pair of CMOS transistors.

Figure 17:
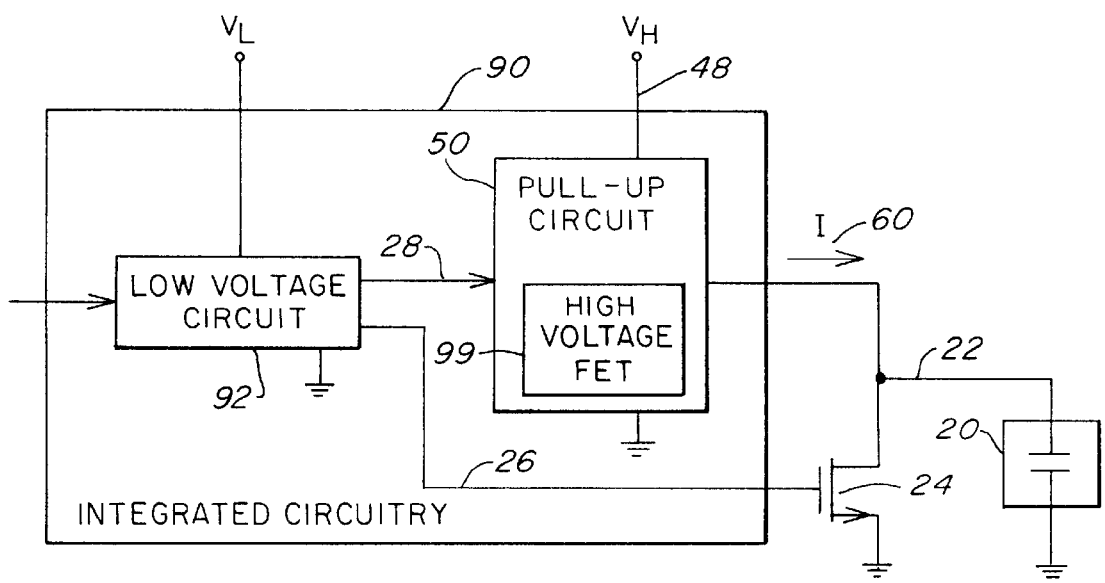
FIG. 17 is a block diagram of integrated circuitry for ultrasound transducers according to another embodiment of the invention.

FIG. 17 shows another embodiment of circuitry for use with ultrasound transducers according to the invention. The unique transducer circuitry 90 of FIG. 17 includes a low-voltage circuit 92 and a pull-up circuit 50. The pull-up circuit 50 is electrically coupled to a high-voltage 48 and outputs a drive current 60 to a high-voltage FET driver 24 located externally of unique transducer circuitry 90. FET driver 24 is coupled to ultrasound transducer element 20 via line 22. While high-voltage FET driver 24 is not included as part of the unique transducer circuitry 90 as shown in FIG. 17, pull-up circuit 50 includes at least one high-voltage FET 99, as discussed above in connection with FIGS. 3 and 4.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended as limiting.

What is claimed is:

1. Integrated circuitry for use with ultrasound transducers, comprising:
   a high-voltage circuit to drive at least one ultrasound transducer element, the high-voltage circuit including a high-voltage FET;
   a low-voltage transmit circuit that communicates with the high-voltage circuit, the low-voltage transmit circuit including high density digital logic circuitry electrically coupled to the high-voltage circuit;
   a low-voltage receive circuit including low noise analog receive circuitry to process a receive signal from the at least one ultrasound transducer element: and
   a transmit receive switch, including a second high-voltage FET, electrically coupled to the high-voltage ciruit, the low-voltage receive ciruit, and the ultrasound transducer element;
   wherein the low-voltage circuit and the high-voltage circuit are monolithically formed on a single substrate.

2. Integrated circuitry for use with ultrasound transducers, comprising:
   A low-voltage high-density digital logic ciruit that communicates with the high-voltage ciruit; and
   a high-voltage circuit, monolithically formed on a single substrate with the low-voltage high-density digital logic ciruit, to drive an ultrasound transducer element, the high-voltage circuit including:
   a high-voltage FET; and
   a pull-up circuit, electrically coupled between a high voltage and the high voltage FET, including:
   a cascoded series configuration of at least two pull-up transistors, electrically coupled to the high voltage and having a pull-up control gate, to output a drive current to the ultrasound transducer element based on a drive signal input to the pull-up control gate; and
   a gate drive transistor to receive an input signal from the low-voltage high-density digital logic circuit and to output the drive signal to the pull-up control gate.

3. Integrated circuitry for use with ultrasound transducers, comprising:
   a high-voltage circuit to drive an ultrasound transducer element, the high-voltage circuit including a high-voltage FET;
   a low-voltage high-density digital logic circuit that communicates with the high-voltage circuit,
   wherein the low-voltage high-density digital logic circuit and the high-voltage circuit are monolithically formed on a single substrate,
   a pull-up transistor, electrically coupled to a high voltage and having a pull-up control gate, to output a drive current to the ultrasound transducer element based on a drive signal input to the pull-up control gate, and
   a gate drive transistor to receive an input signal from the low-voltage circuit and output the drive signal to the pull-up control gate,
   wherein at least one of the pull-up transistor and the gate drive transistor is the high-voltage FET.

4. Integrated circuitry for use with ultrasound transducers, comprising:
   a first low-voltage CMOS circuit including high density digital logic circuitry having a CMOS breakdown voltage; and
   a high-voltage CMOS circuit to drive an ultrasound transducer element, the high-voltage CMOS circuit receiving an input signal from the first low-voltage CMOS circuit and including a high-voltage FET, the high-voltage FET including a lightly doped drain region and having a high breakdown voltage greater than the CMOS breakdown voltage,
   wherein the first low-voltage CMOS circuit and the high-voltage CMOS circuit are monolithically formed on a single substrate;

a second low-voltage CMOS circuit monolithically formed with the first low-voltage CMOS circuit and the high-voltage CMOS circuit on the single substrate, the second low-voltage CMOS circuit comprising low noise analog receive circuitry to process a receive signal from the ultrasound transducer element;

at least one pull-up transistor, electrically coupled to a high voltage and having a pull-up control gate, to output a drive current to the ultrasound transducer element based on a drive signal input to the pull-up control gate; and at least one gate drive transistor for each at least one pull-up transistor, to receive the input signal from the first low-voltage circuit and to output the drive signal to the pull-up control gate.

5. An integrated high-voltage driver circuit for use with ultrasound transducers, comprising:

a high-voltage FET driver to drive an ultrasound transducer element; and a pull-up circuit comprising:

a pull-up transistor circuit electrically coupled to the high voltage and having a driver output electrically coupled to one of a source and a drain of the high-voltage FET driver, the pull-up transistor circuit comprising a plurality of pull-up transistor, cascaded in series, the series being coupled between the high voltage and the one of the source and the drain of the high-voltage FET driver, each pull-up transistor having a pull-up control gate and connected in series with another pull-up transistor, the pull-up transistor circuit outputting a drive current to the ultrasound transducer element based on a drive signal input to the pull-up control gate of each pull-up transistor; and a plurality of gate drive transistor, each gate drive transistor receiving an input signal and outputting the drive signal to the pull-up control gate of a respective pull-up transistor, wherein the high-voltage FET driver and the pull-up circuit are monolithically formed on a single substrate.

6. The integrated circuit of claim 5, wherein:

the high-voltage FET driver comprises a driver control gate; and the integrated high-voltage driver circuit further comprises an inverter to receive the input signal and output a transmit signal to the driver control gate.

7. The integrated circuit of claim 5, wherein the plurality of pull-up transistors and the plurality of gate drive transistors are high-voltage FETs.

8. The integrated circuit of claim 5, wherein:

the high-voltage FET driver is an NMOS device;

each pull-up transistor of the plurality of pull-up transistors is a PMOS FET; and each gate driver transistor of the plurality of gate driver transistors is an NMOS FET.

9. Integrated circuitry for use with ultrasound transducers, comprising:

a low-voltage circuit; and a high-voltage circuit to drive an ultrasound transducer, comprising:

a high-voltage FET driver;

a pull-up circuit comprising a plurality of pull-up transistors cascoded in series, each pull-up transistor of the plurality of pull-up transistors having a control gate, the pull-up circuit being electrically coupled to a high voltage and having a driver output electrically coupled to the high-voltage FET driver to provide a drive current to the ultrasound transducer element based on a drive signal input to the pull-up control gate of each pull-up transistor; and a plurality of gate drive transistors, each gate drive transistor of the plurality of gate drive transistors having a control gate to receive an input signal from the low voltage circuit, each gate drive transistor outputting the drive signal to one of the plurality of pull-up transistors, wherein the low-voltage circuit and the high-voltage circuit are monolithically formed on a single substrate.

* * * * *